(12) United States Patent
Miyagawa et al.

(10) Patent No.: US 6,940,872 B1
(45) Date of Patent: Sep. 6, 2005

(54) BLOCK FORMING METHOD AND APPARATUS OF DIGITAL BIT STREAM

(75) Inventors: Ken Miyagawa, Tokorozawa (JP);
Masanori Nakahara, Tokorozawa (JP);
Shunji Ikegami, Tokorozawa (JP)

(73) Assignee: Pioneer Corporation, Tokyo (JP)

( * ) Notice: Subject to any disclaimer, the term of this patent is extended or adjusted under 35 U.S.C. 154(b) by 649 days.

(21) Appl. No.: 09/607,336

(22) Filed: Jun. 30, 2000

(30) Foreign Application Priority Data

Jul. 5, 1999 (JP) .................................. 11-190953

(51) Int. Cl.$^7$ .............................................. H04J 3/24
(52) U.S. Cl. ...................... 370/473; 370/474; 370/528
(58) Field of Search ................................ 370/470, 471, 370/472, 473, 474, 476, 468, 528, 506; 714/701

(56) References Cited

U.S. PATENT DOCUMENTS

| | | | |
|---|---|---|---|
| 5,050,166 A * | 9/1991 | Cantoni et al. ............. | 370/473 |
| 5,483,532 A * | 1/1996 | Eriksson ..................... | 370/473 |
| 5,537,408 A * | 7/1996 | Branstad et al. ............ | 370/473 |
| 5,541,919 A * | 7/1996 | Yong et al. .................. | 370/416 |
| 5,801,781 A * | 9/1998 | Hiroshima et al. .......... | 348/441 |
| 5,892,848 A * | 4/1999 | Nishiwaki et al. .......... | 382/232 |
| 6,156,003 A * | 12/2000 | Suresh ........................ | 604/24 |
| 6,504,845 B1 * | 1/2003 | Petersen et al. ............. | 370/412 |

* cited by examiner

*Primary Examiner*—Wellington Chin
*Assistant Examiner*—Chuong Ho
(74) *Attorney, Agent, or Firm*—Morgan Lewis & Bockius LLP

(57) ABSTRACT

Block forming method and apparatus of a digital bit stream, in which such an inconvenience that in spite of the fact that additional data regarding a partial packet to be located at the end of a main data portion exists in an additional data portion, the partial packet becomes a block in which no byte actually exists can be eliminated. When a space area smaller than one packet occurs in the end portion of the main data portion of the data block, partial data of the next packet is stored in the space area, the additional data of the next packet is stored in the additional data portion as additional data of one partial packet and the remaining data of the partial data of the next packet is stored in a start portion of the main data portion of a next data block. When the space area does not occur in the end portion of the main data portion, additional data invalid information showing that the additional data of one partial packet is invalid is stored in a portion other than the main data portion in the data block.

30 Claims, 14 Drawing Sheets

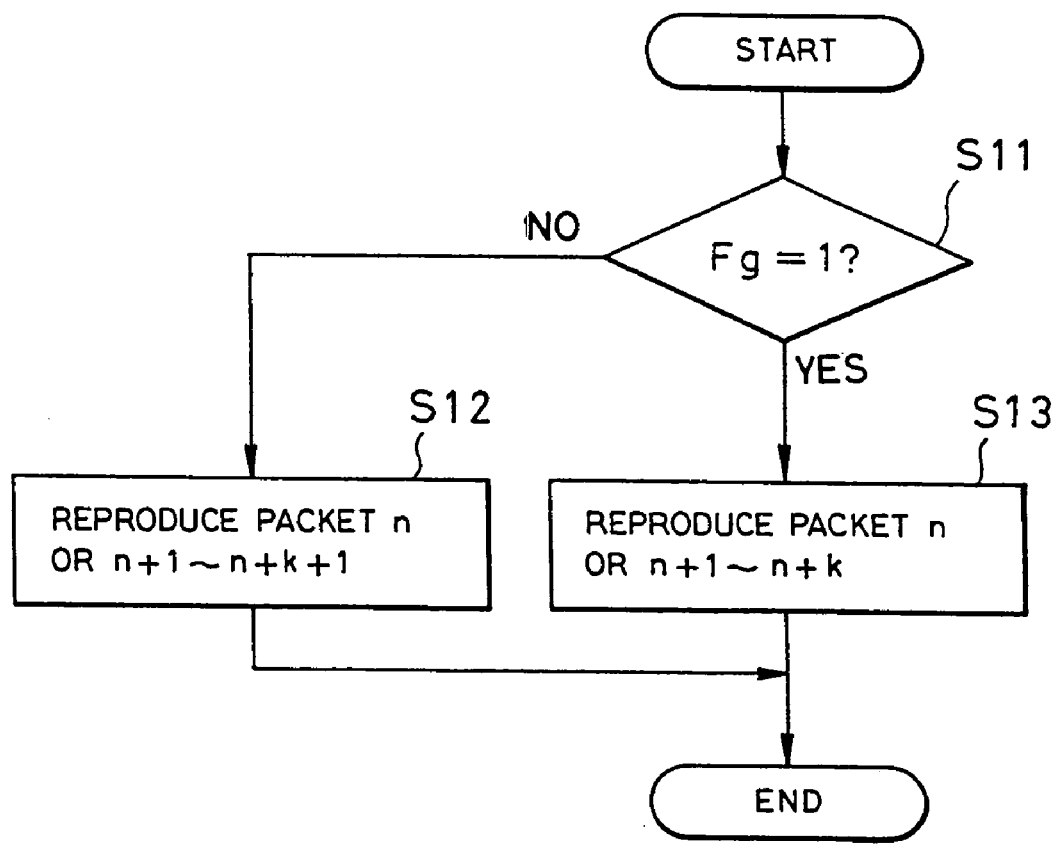

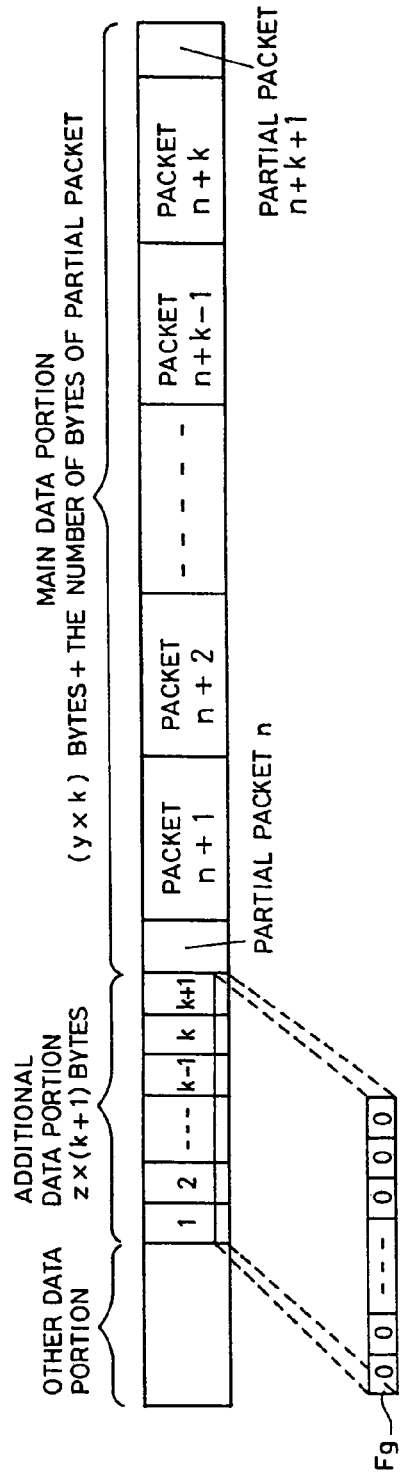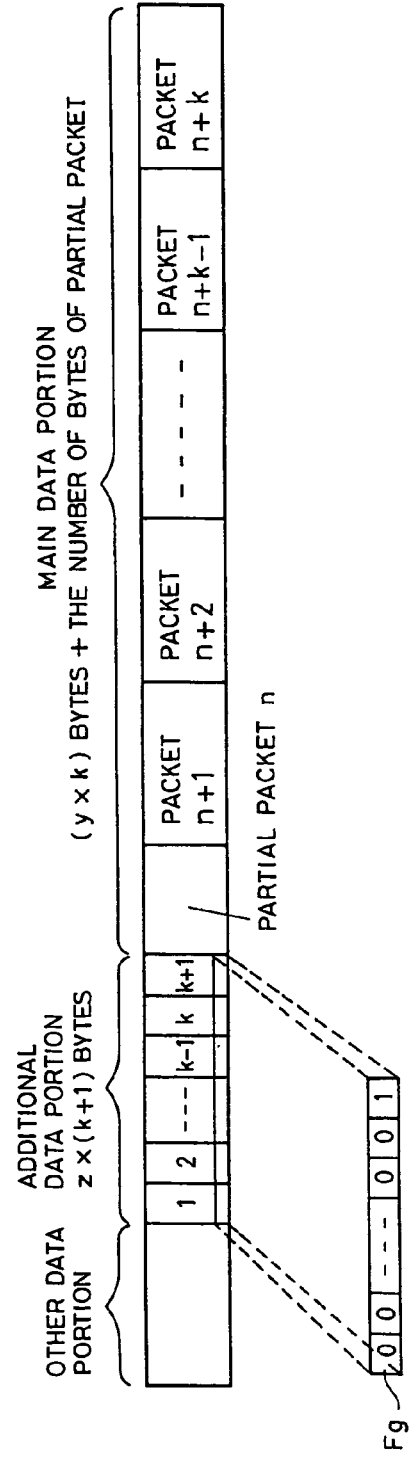

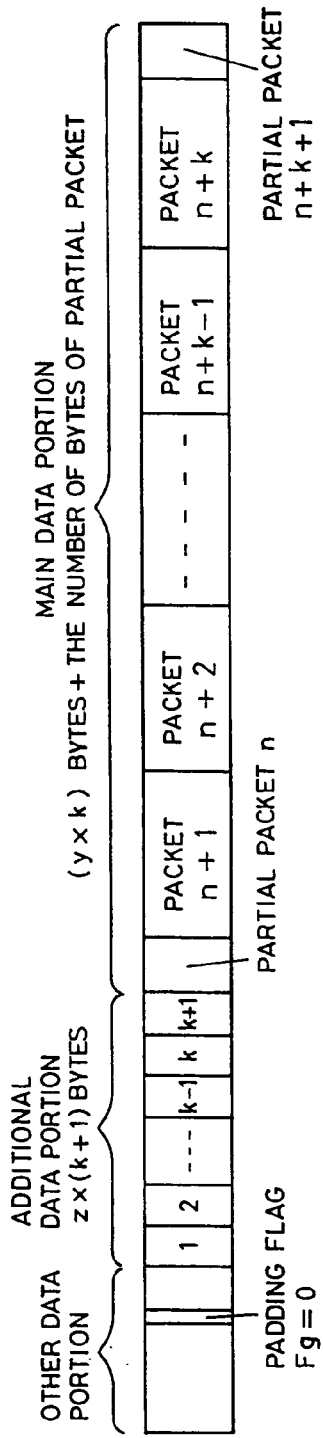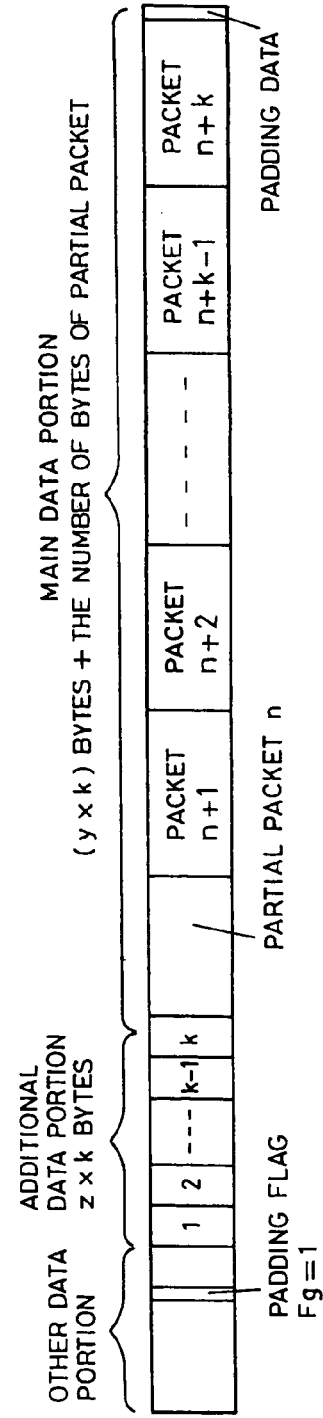

BLOCK FORMING METHOD AND APPARATUS OF DIGITAL BIT STREAM

BACKGROUND OF THE INVENTION

1. Field of the Invention

The invention relates to a method for forming blocks from a digital bit stream and an apparatus for the same.

2. Description of the Related Art

There is a method whereby a digital bit stream is recorded as it is onto a recording medium such as a recordable DVD (Digital Versatile Disc) and the recorded digital bit stream is simply reproduced from the recording medium. As a digital bit stream, for example, MPEG2-TS (Moving Picture Experts Group 2-Transport Stream) can be used. Usually, data showing the contents of one of a plurality of programs has been multiplexed in the stream on a packet unit basis and it is called "Full TS". A transfer rate is set to 20 to 30 Mbps or more.

Assuming that the packets of Full TS are sequential like P1, P2, P3, . . . with respect to time as shown in FIG. 1A, a program is designated by the user at the time of recording onto a recording medium and, thereafter, the packet corresponding to the designated program is selected. Assuming that the packets corresponding to the program selected by the user designation are the hatched packets P1, P3, P6, P9, . . . among the packets P1, P2, P3, . . . in FIG. 1A, blanks on time exist among the packets as shown in FIG. 1B, respectively. The above stream is called "Partial TS". In the Partial TS, in the case of programs of the standard television system, a transfer rate per program is equal to about 4 to 9 Mbps although it depends on the contents of the program. The Partial TS is recorded onto the recording medium such as a DVD.

As for a time interval between the packets of the Partial TS, although the interval upon recording has to be held at the time of playing the recording medium, it is improper to record the blank time of the Partial TS as it is onto the recording medium in terms of a capacity of the recording medium. Since it is necessary to record time information showing the blank time in some form, therefore, in a digital stream recorder, the arrival time of the packet of the Partial TS is added as time stamp information of a predetermined number of bytes to the head of each packet as shown in FIG. 1C and it is recorded onto the recording medium without a gap. As a storing format for recording, for example, a private 2 of MPEG2-PS (program stream) can be mentioned in consideration of the recording onto the DVD. As will be explained hereinlater, stream identification information is added to the stream in order to recognize the private stream.

Upon reproduction of the recording medium, the value of the time stamp information is detected and the packets are transmitted in accordance with its detecting timing. That is, each packet is transmitted in a state where the blank time between the respective packets upon recording has perfectly been reconstructed. The transmitted packets are supplied to an MPEG decoder, the data of the packet is decoded, and a reproduction signal of the selected program is generated.

A recording area of the recording medium is divided into a plurality of sectors and the packet is recorded in each sector. For example, one sector consists of 2048 bytes corresponding to one sector length for the DVD. As shown in FIG. 2, a pack header, a PES header, stream ID (identification) information, an application header, an additional data portion, and a main data portion are formed from the beginning in one sector. A plurality of time stamps (TS) and a plurality of packets are recorded in the main data portion. A length of packet is the length of packet in the Partial TS and is equal to 188 bytes.

The pack header and the PES header conform with the MPEG standard. As mentioned above, as stream ID information, the ID information used for recognizing the private stream in the video recording is used. Information such as the number of packets in the sector, length of packet, and the like is recorded in the application header. The additional data portion is an area where random access information or the like is recorded and additional information of z bytes is provided for one packet. When k packets exist in the sector, the additional data portion consists of (z×k) bytes.

Although the data is recorded in the main data portion in a state where the time stamps have been added to the packets, a length of main data portion is not equal to the length that is integer times as long as the length in which the time stamps have been added to the packets. Since the packets are sequentially filled in the sector from the supplied packets, the beginning bit of the time stamp is not always recorded to the start position of the main data portion. A partial packet is rather located in each of the start and end portions of the main data portion as shown in FIG. 3. The partial packet of the start portion is a continuing portion of the partial packet of the end portion of the main data portion of the previous sector. As for the partial packet, the values of the length and the like thereof are recorded in the application header.

Assuming that one sector consists of the same number of bytes, namely, 2048 bytes as that of the DVD or the like, each portion has the following length.

Pack header: 14 bytes
PES header: 6 bytes
Stream ID information: 1 byte
Application header: j bytes
Additional data portion: z bytes per packet
1 packet+1 time stamp: s+t bytes Each of the pack header, PES header, stream ID information, and application header always has the fixed length.

When 10 packets are recorded in the main data portion of a sector, it has a length of {21+j+(z+s+t)×10} bytes. A remainder area of [2048{21+j+(z+s+t)×10}] bytes, therefore, occurs in the sector and it is allocated to the partial packet.

When the next packet and its time stamp are allocated to the remainder area, also with respect to the partial packet, z bytes for the additional data portion are added after the additional data portion of 10×z bytes. That is, the additional data portion consists of 11×z bytes, so that the number of bytes of the partial packet and its time stamp is actually set [2048−{21+j+(z+s+t)×10}−z] bytes. The remaining portion of the partial packet is located after the additional data portion of the next sector.

When the data of each sector is sequentially formed by the above method, the number of space bytes in a sector of a certain designated number is equal to or less than z bytes. If the space bytes are allocated to the additional data portion, the remaining bytes disappear due to the space bytes alone as shown in FIG. 4. One byte of each of the time stamp and the packet main body of the next packet cannot be allocated to this sector. There is, consequently, a possibility of the occurrence of an error when the data of this sector is read out and reproduced.

The above problem occurs in the case where a bit train consisting of y bytes of the digital bit stream is divided as one packet into blocks each having a predetermined length and stored into a storage apparatus such as a hard disk or the like.

In the case, the main data portion where a plurality of packets are stored and the additional data portion corresponding to each packet before the main data portion are provided for each block. The additional data portion shows the data such as random access information of every packet of the main data portion and each additional data is, for example, data of one byte.

Assuming that only k packets each consisting of y bytes can be formed in the main data portion in a complete state, only k+1 additional data each consisting of z bytes is formed in the additional data portion, and the packets are arranged from the main data portion of the first block without a gap, in the main data portion of the i-th block, the remaining portion of the last packet, namely, the partial packet n of the main data portion in the (i-1)-th block is located first as shown in FIG. 5. The complete packets n+1, n+2, . . . , and n+k are subsequently arranged. The packet n+k+1 is arranged in a partial form into the remaining blank portion of the main data portion in the order of the bits. Additional data 1 corresponding to the packet n+1, additional data 2 corresponding to the packet n+2, additional data k corresponding to the packet n+k, and additional data k+1 corresponding to the packet n+k+1 are arranged in the additional data portion. The value of k changes in dependence on the number of bytes in the remaining portion of the partial packet n.

Assuming that a size of one block is equal to B bytes, since $$B = (k+1) \times z + k \times y + \text{(the number of bytes of the partial packets } n \text{ and } n+k+1),$$

the following equation has to be satisfied.

$$\text{(The number of bytes of the partial packets } n \text{ and } n+k+1) = B - \{(k+1) \times z + k \times y\}$$

If the number of bytes in the remaining portion of the partial packet n is equal to $[B \sim \{(k+1) \times z + k \times y\}]$, therefore, the data of the partial packet n+k+1 cannot be provided in the main data portion as shown in FIG. 6.

That is, such an inconvenience that the packet n+k+1 becomes the block in which no byte exists in spite of the fact that the additional data k+1 regarding the partial packet n+k+1 exists in the additional data portion occurs. If the data is recorded by the above block, there is such a possibility that an error occurs at the time of a reproducing process and the original digital bit stream cannot be reproduced.

OBJECTS AND SUMMARY OF THE INVENTION

It is, therefore, an object of the invention to provide block forming method and apparatus of a digital bit stream, in which it is possible to solve such an inconvenience that in spite of the fact that additional data regarding a partial packet to be located at the end of a main data portion exists in an additional data portion, the partial packet becomes a block in which no byte actually exists.

According to one aspect of the invention, there is provided a block forming method of a digital bit stream, whereby the digital bit stream consisting of a plurality of packets having a same length is converted into a data block and at least a main data portion in which a plurality of complete packets and partial packets consisting of only partial data can be arranged and an additional data portion in which additional data of each of the complete packets in the main data portion and additional data of one partial packet are stored are formed in the data block, comprising the steps of: when a space area smaller than one packet occurs in an end portion of the main data portion, storing a part of the data of a next packet into the space area, storing additional data of the next packet into the additional data portion as additional data of the one partial packet, and storing remaining data of the part of the data of the next packet into a start portion of the main data portion of a next data block; and when the space area does not occur in the end portion of the main data portion, storing additional data invalid information showing that the additional data of the one partial packet is invalid into a portion other than the main data portion in the data block.

According to another aspect of the invention, there is provided a block forming method of a digital bit stream, whereby the digital bit stream consisting of a plurality of packets having a same length is converted into a data block and at least a main data portion in which a plurality of complete packets and partial packets consisting of only partial data can be arranged and an additional data portion in which additional data of each of the complete packets in the main data portion is stored are formed in the data block, comprising the steps of: when a space area smaller than one packet and larger than a size of additional data occurs in an end portion of the main data portion, storing a part of the data of a next packet into the space area, storing the additional data of the next packet into the additional data portion as additional data of the part of the data of the next packet together with the additional data of each of the complete packets, and storing remaining data of the part of the data of the next packet into a start portion of the main data portion of a next data block; and when a space area smaller than the size of additional data occurs in the end portion of the main data portion, storing information showing that no partial packet exists in the end portion of the main data portion into a portion other than the main data portion and the additional data portion in the data block.

According to still another aspect of the invention, there is provided a block forming apparatus in which a digital bit stream consisting of a plurality of packets having a same length is converted into a data block and at least a main data portion in which a plurality of complete packets and partial packets consisting of only partial data can be arranged and an additional data portion in which additional data of each of the complete packets in the main data portion and additional data of one partial packet are stored are formed in the data block, comprising: discriminating means for discriminating whether a space area smaller than one packet has occurred in an end portion of the main data portion or not; and block processing means for when the space area smaller than one packet occurs in the end portion of the main data portion, storing a part of the data of a next packet into the space area, storing additional data of the next packet into the additional data portion as additional data of the one partial packet, and storing remaining data of the part of the data of the next packet into a start portion of the main data portion of a next data block, wherein when the space area does not occur in the end portion of the main data portion, the block processing means stores additional data invalid information showing that the additional data of the one partial packet is invalid into a portion other than the main data portion in the data block.

According to further another aspect of the invention, there is provided a block forming apparatus in which a digital bit stream consisting of a plurality of packets having a same length is converted into a data block and at least a main data portion in which a plurality of complete packets and partial packets consisting of only partial data can be arranged and an additional data portion in which additional data of each of the complete packets in the main data portion is stored are formed in the data block, comprising: means for discriminating whether a space area smaller than one packet and larger than a size of additional data has occurred in an end portion of the main data portion or not; and block processing means for when the space area smaller than one packet and larger than the size of additional data occurs in the end portion of the main data portion, storing a part of the data of a next packet into the space area, storing the additional data of the next packet into the additional data portion as additional data of the part of the data of the next packet together with the additional data of each of the complete packets, and storing remaining data of the part of the data of the next packet into a start portion of the main data portion of a next data block, wherein when a space area smaller than the size of additional data occurs in the end portion of the main data portion, the block processing means stores information showing that no partial packet exists in the end portion of the main data portion into a portion other than the main data portion and the additional data portion in the data block.

BRIEF DESCRIPTION OF THE DRAWINGS

FIG. 12 is a flowchart showing the operation of a reproducing circuit;

FIG. 13 is a diagram showing a status of the additional data invalid flag of each additional data in the data block in the case where the partial packets are located in the start and end portions of the main data portion;

FIG. 14 is a diagram showing a status of the additional data invalid flag of each additional data in the data block in the case where the partial packet is located only in the start portion of the main data portion;

FIG. 15 is a diagram showing a status of a padding flag in the data block in the case where the partial packets are located in the start and end portions of the main data portion;

FIG. 16 is a diagram showing a status of the padding flag in the data block in the case where the partial packet is located only in the start portion of the main data portion;

DETAILED DESCRIPTION OF THE PREFERRED EMBODIMENTS

An embodiment of the present invention will now be described in detail hereinbelow with reference to the drawings.

Figure 7:
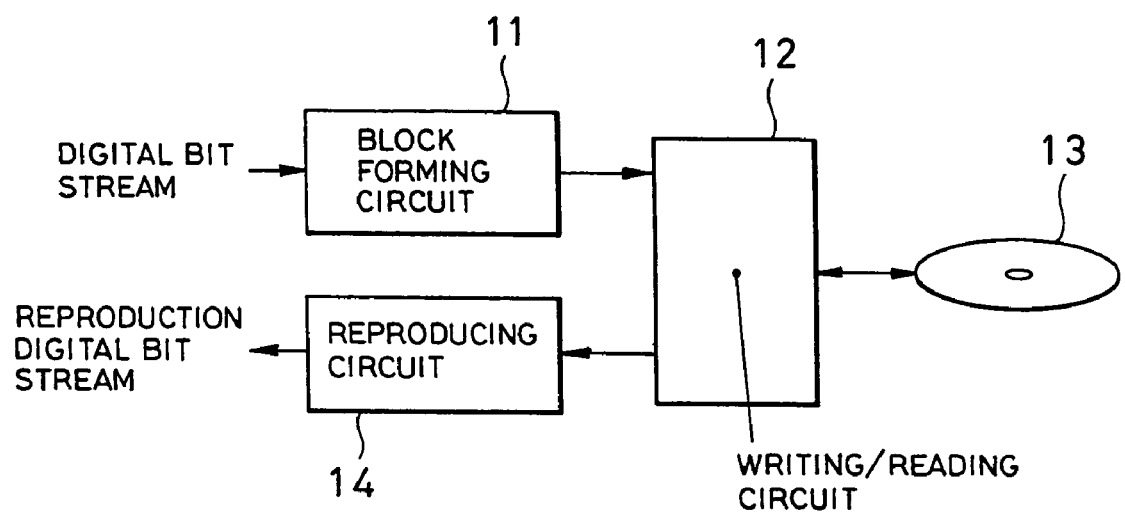
FIG. 7 is a block diagram showing a recording and reproducing apparatus to which a block forming method of the invention is applied.

FIG. 7 shows a recording and reproducing apparatus to which a block forming method of a digital bit stream according to the invention is applied. The digital bit stream which is supplied to the recording and reproducing apparatus is a train of packets each consisting of y bytes as mentioned above. The digital bit stream is supplied to a block forming circuit 11. In the block forming circuit 11, a block forming process for dividing the digital bit stream into blocks is executed as will be explained hereinlater. A writing/reading circuit 12 is connected to an output of the block forming circuit 11. The writing/reading circuit 12 writes the output data of the block forming circuit 11 onto a writable recording medium 13 every data block at the time of the writing mode and reads out the data written on the recording medium 13 every block at the time of the reading mode. The data read out by the writing/reading circuit 12 is reproduced as an original digital bit stream by a reproducing circuit 14.

The operation of the block forming circuit 11 will now be described.

Figure 8:
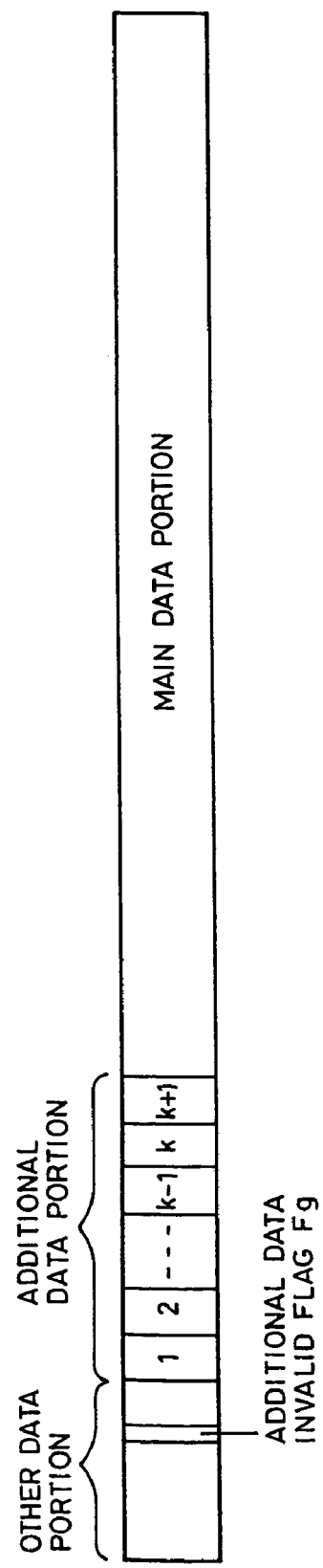
FIG. 8 is a diagram showing a data block structure in which an additional data invalid flag is provided in the other data portion.

The block forming circuit 11 forms a block as shown in FIG. 8. A main data portion in which a plurality of packets are stored, an additional data portion which corresponds to each packet and is arranged before the main data portion, and other data portion before the additional data portion are arranged in each block. An additional data invalid flag Fg is provided as other information in the other data portion.

Figure 9:
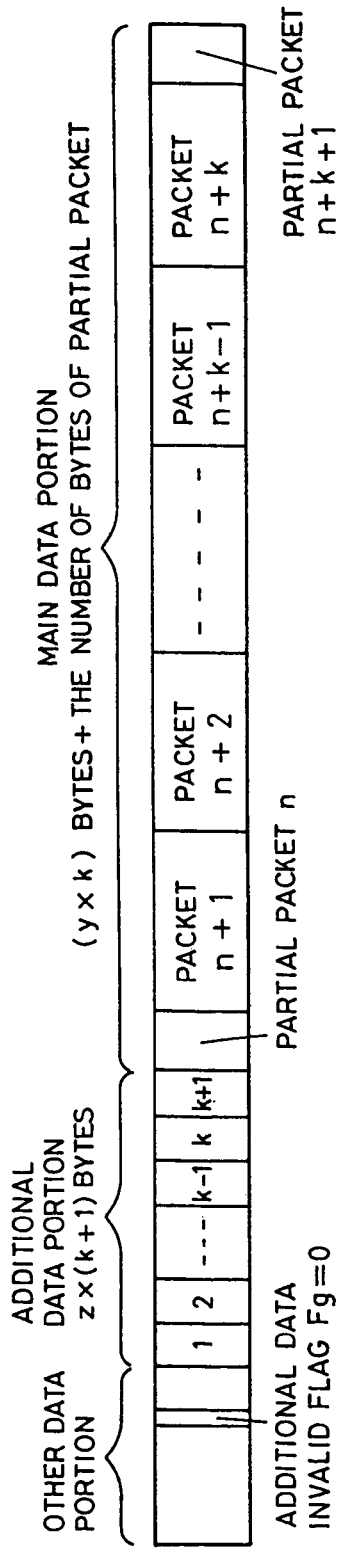
FIG. 9 is a diagram showing a status of the additional data invalid flag in the data block in the case where the partial packets are located in start and end portions of the main data portion.

Only k packets each consisting of y bytes can be formed in the main data portion in a complete state. Only (k+1) additional data each consisting of z bytes is formed in the additional data portion. Assuming that the packets are in turn arranged from the main data portion of the first block without a gap, in the main data portion of the i-th block, as shown in FIG. 9, a remaining portion of the last packet, namely, the partial packet n (n is an integer: n≧0) of the main data portion in the (i−1)-th block is located first. The complete packets n+1, n+2, ..., and n+k are arranged. The packet n+k+1 is arranged in a partial form in the remaining space portion of the main data portion in the order of the bits. The additional data 1 corresponding to the packet n+1, the additional data 2 corresponding to the packet n+2, ..., the additional data k corresponding to the packet n+k, and the additional data k+1 corresponding to the packet n+k+1 are arranged in the additional data portion. The value of k changes in dependence on the number of bytes in the remaining portion of the partial packet n.

Assuming that a total size of the additional data portion and the main data portion in the block is equal to A bytes for convenience of explanation, since $A=(k+1) \times z+k \times y+$(the number of bytes of the partial packets $n$ and $n+k+1$), the following equation has to be satisfied.

Figure 10:
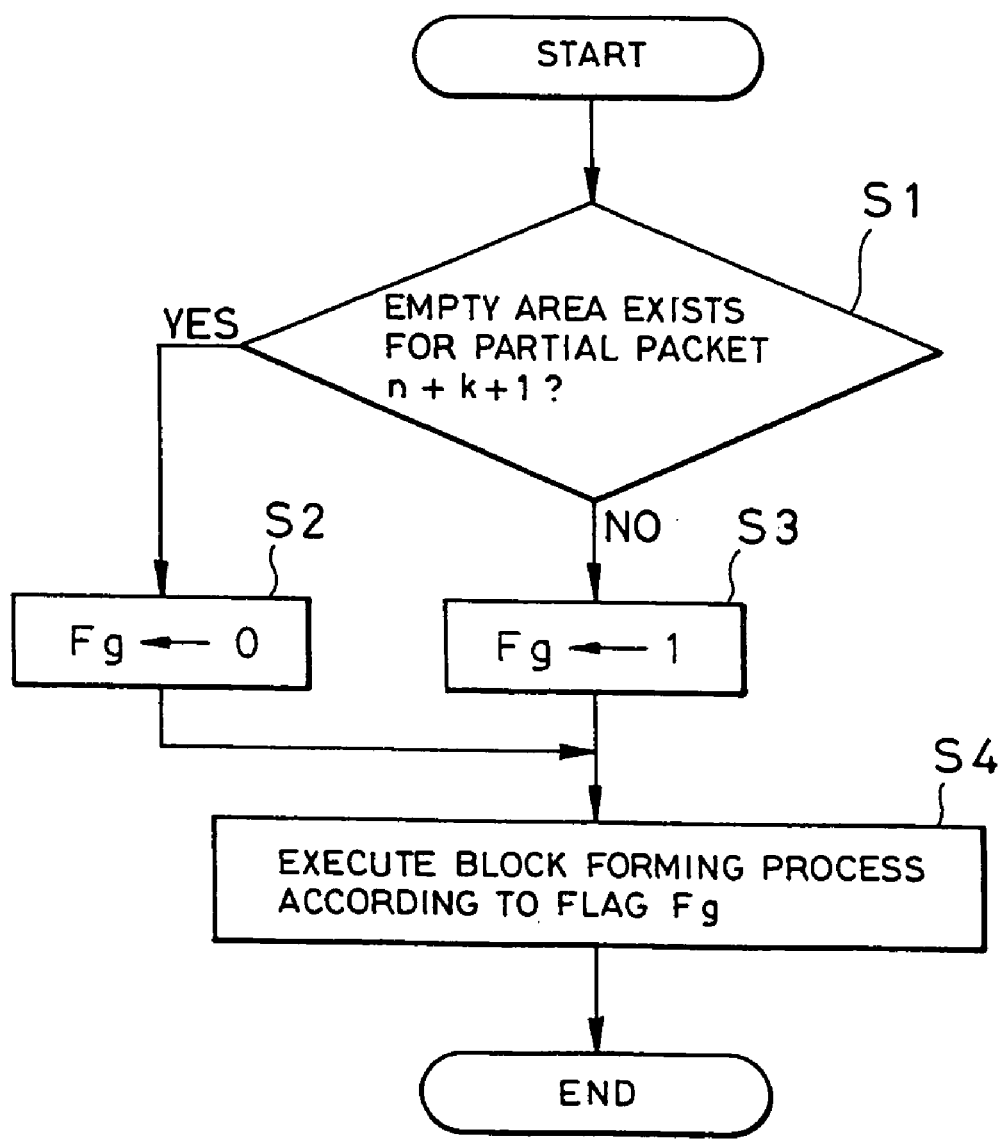
FIG. 10 is a flowchart showing the operation of a block forming circuit.

(The number of bytes of the partial packets $n$ and $n+k+1$)=$A-\{(k+1) \times z+k \times y\}$ In the block forming circuit 11, therefore, as shown in FIG. 10, whether the number of bytes of the remaining portion of the partial packet n is equal to $[A-\{(k+1) \times z+k \times y\}]$ or not is discriminated, namely, whether a space portion to be allocated to the partial packet n+k+1 exists in the end portion of the main data portion or not is discriminated (step S1). If the number of bytes of the remaining portion of the partial packet n is smaller than $[A-\{(k+1) \times z+k \times y\}]$, the space portion to be allocated to the partial packet n+k+1 exists in the main data portion. Thus, the additional data invalid flag Fg is set to Fg=0 as shown in FIG. 9 (step S2).

Figure 11:
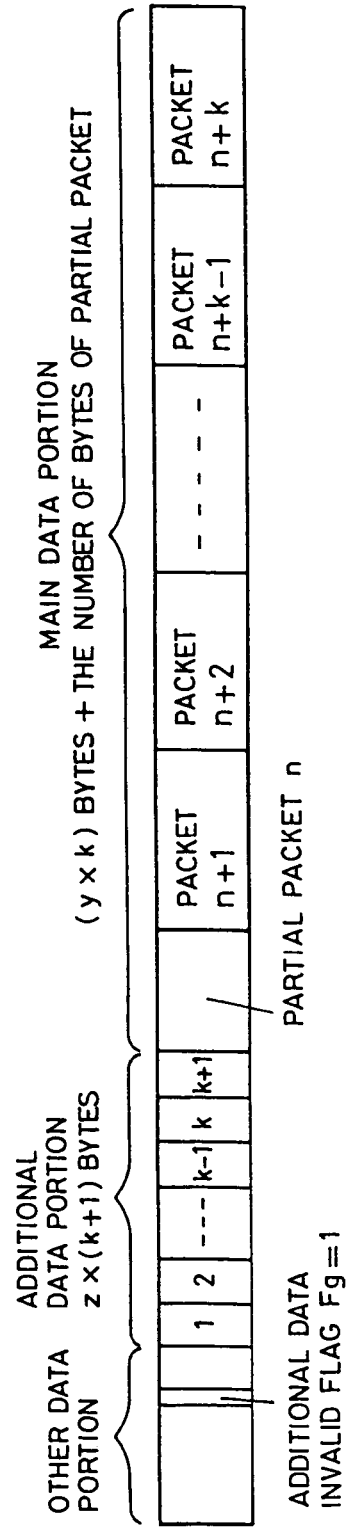
FIG. 11 is a diagram showing a status of the additional data invalid flag in the data block in the case where the partial packet is located only in the start portion of the main data portion.

If the number of bytes of the remaining portion of the partial packet n is equal to $[A-\{(k+1) \times z+k \times y\}]$, the space portion to be allocated to the partial packet n+k+1 does not exist in the main data portion as shown in FIG. 11. Thus, the additional data invalid flag Fg is set to Fg=1 (step S3). The block forming process is performed in accordance with a setting result in step S2 or S3 (step S4).

In the recording mode, the blocks having the additional data invalid flag Fg set as mentioned above are sequentially formed and they are recorded onto the recording medium 13 by the writing/reading circuit 12 in the forming order.

In the reproducing mode, the recorded data is read out from the recording medium 13 on a block unit basis by the writing/reading circuit 12. The read blocks are sequentially supplied to the reproducing circuit 14 from the writing/reading circuit 12.

In the reproducing circuit 14, whether the additional data invalid flag Fg is equal to 1 or not is discriminated every block as shown in FIG. 12 (step S11). When Fg=0, the packet n or the packets n+1 to n+k+1 are reproduced (step S12). When Fg= 1, the packet n or the packets n+1 to n+k are reproduced (step S13). If the partial packet n does not exist at the beginning of the main data portion, for instance, when n=0, the reproducing process is started from the packet n+1.

In the reproducing process, the packets existing in the block are converted into the digital bit stream of the original timing. This timing is obtained on the basis of the information in the other data portion and additional data portion.

Although the additional data invalid flag Fg is provided in the other information in the foregoing embodiment, it can be also provided in the additional data instead of the inside of the other information. In the case, as shown in FIG. 13, the remaining portion of the last packet, namely, the partial packet n of the main data portion in the (i-1)-th block is located at the beginning. The complete packets n+1, n+2, . . . , and n+k are arranged. The packet n+k+1 is arranged in a partial form into the remaining space portion of the main data portion in the order of the bits. The additional data 1 corresponding to the packet n+1, the additional data 2 corresponding to the packet n+2, . . . , the additional data k corresponding to the packet n+k, and the additional data k+1 corresponding to the packet n+k+1 are arranged in the additional data portion. The additional data invalid flag Fg is included in each of the additional data 1 to k+1 in the additional data portion. The value of k changes in dependence on the number of bytes in the remaining portion of the partial packet n.

Assuming that a total size of the additional data portion and the main data portion in the block is equal to A bytes in a manner similar to the case shown in FIG. 9, since $A=(k+1) \times z+k \times y+$(the number of bytes of the partial packets $n$ and $n+k+1$), the following equation has to be satisfied.

(The number of bytes of the partial packets $n$ and $n+k+1$)=$A-\{(k+1) \times z+k \times y\}$ Whether the number of bytes of the remaining portion of the partial packet n is equal to $[A-\{(k+1) \times z+k \times y\}]$ or not is, therefore, discriminated. If the number of bytes of the remaining portion of the partial packet n is smaller than $[A-\{(k+1) \times z+k \times y\}]$, the space portion to be allocated to the partial packet n+k+1 exists in the main data portion. In the case, all of the additional data invalid flags Fg are set to Fg= 0 as shown in FIG. 13.

If the number of bytes of the remaining portion of the partial packet n is equal to $[A-\{(k+1) \times z+k \times y\}]$, the space portion to be allocated to the partial packet n+k+1 does not exist in the main data portion as shown in FIG. 14. Thus, the additional data invalid flag Fg in the additional data k+1 is set to Fg=1. All of the additional data invalid flags Fg in the other additional data 1 to k are set to Fg=0.

The additional data invalid flag Fg showing whether the additional data in the additional data portion is invalid or not is provided in each of the embodiments. It is also possible to construct the apparatus in such a manner that when the additional data k+1 is provided in the additional data portion, if the packet corresponding thereto does not exist, padding data is inserted into the space area of the main data portion without providing the additional data k+1 and a padding flag Fg showing the insertion of the padding data is provided in the other data portion. That is, assuming that a total size of the additional data portion and the main data portion in the block is equal to A bytes in a manner similar to the case shown in FIG. 9, since $A=(k+1) \times z+k \times y+$(the number of bytes of the partial packets $n$ and $n+k+1$), the following equation has to be satisfied.

(The number of bytes of the partial packets $n$ and $n+k+1$)=$A-\{(k+1) \times z+k \times y\}$ Whether the number of bytes of the remaining portion of the partial packet n is equal to $[A-\{(k+1) \times z+k \times y\}]$ or not is, therefore, discriminated. If the number of bytes of the remaining portion of the partial packet n is smaller than $[A-\{(k+1) \times z+k \times y\}]$, the space portion to be allocated to the partial packet n+k+1 exists in the main data portion. Thus, the padding flag Fg is set to Fg=0 as shown in FIG. 15.

In the case where the number of bytes of the remaining portion of the partial packet n is equal to $[A-\{(k+1) \times z+k \times y\}]$, if the additional data k+1 is provided, the space portion to be allocated to the partial packet n+k+1 does not exist in the main data portion. As shown in FIG. 16, therefore, the additional data k+1 is not provided but the padding data of z bytes is inserted into the end portion of the main data portion, so that the padding flag Fg is set to Fg=1. The padding data is data in which, for example, all bits are equal to 0.

At the time of recording, the blocks having the padding flag Fg set as mentioned above are sequentially recorded onto the recording medium 13 by the writing/reading circuit 12. At the time of reproduction, in the reproducing circuit 14, whether the padding flag Fg is equal to 1 or not is discriminated every block in step S11 mentioned above. When Fg=0, the packet n or the packets n+1 to n+k+1 are reproduced in step S12. When Fg= 1, the packet n or the packets n+1 to n+k are reproduced in step S13.

Figure 17:
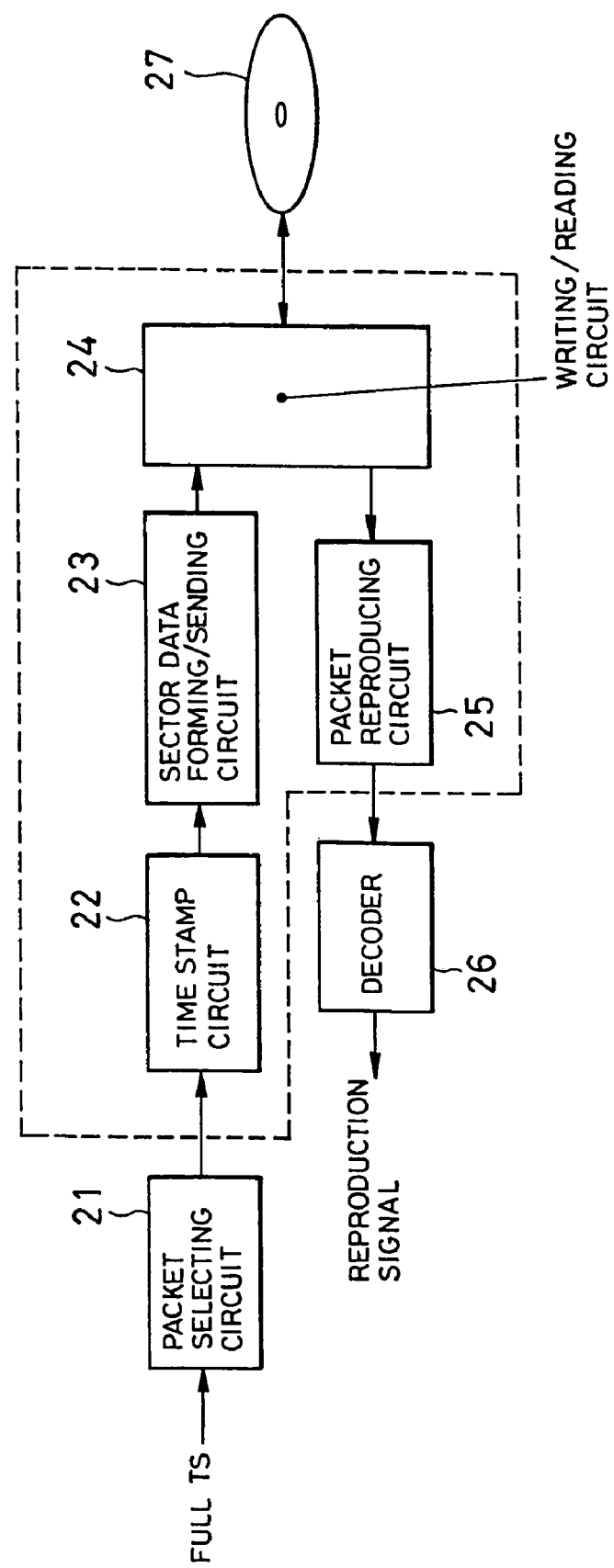
FIG. 17 is a block diagram showing a DVD recording and reproducing apparatus to which the block forming method of the invention is applied.

An embodiment where a recording and reproducing apparatus of a writable DVD is applied with the invention will now be described. FIG. 17 shows a construction of the recording and reproducing apparatus. The recording and reproducing apparatus comprises a packet selecting circuit 21, a time stamp circuit 22, a sector data forming/sending circuit 23, a writing/reading circuit 24, a packet reproducing circuit 25, and a decoder 26. A portion surrounded by a broken line in FIG. 17 constructs a digital stream recorder.

Figure 1:
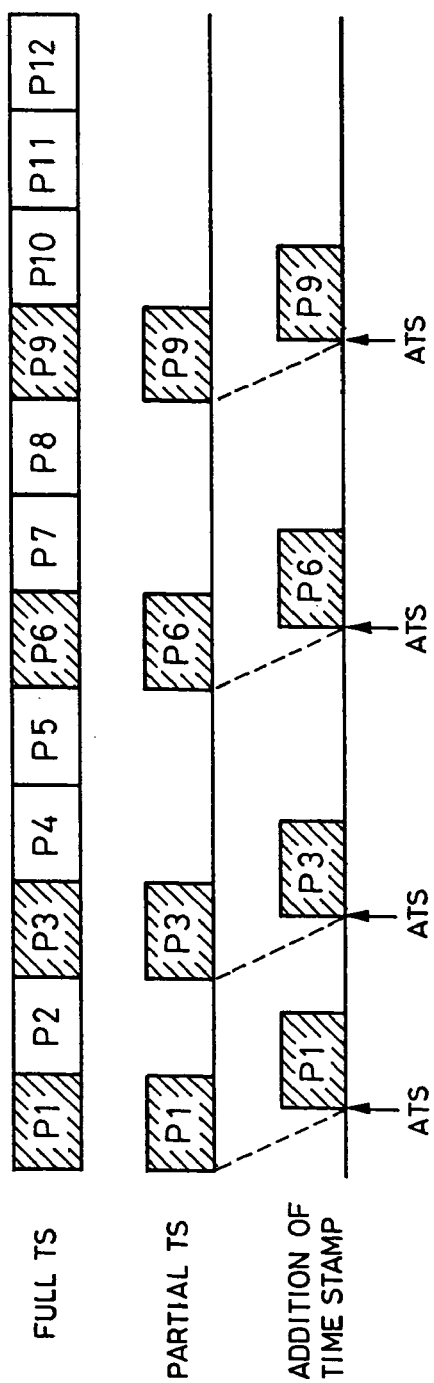
FIGS. 1A to 1C are diagrams showing a packet conversion upon recording of a digital bit stream.
Figure 2:
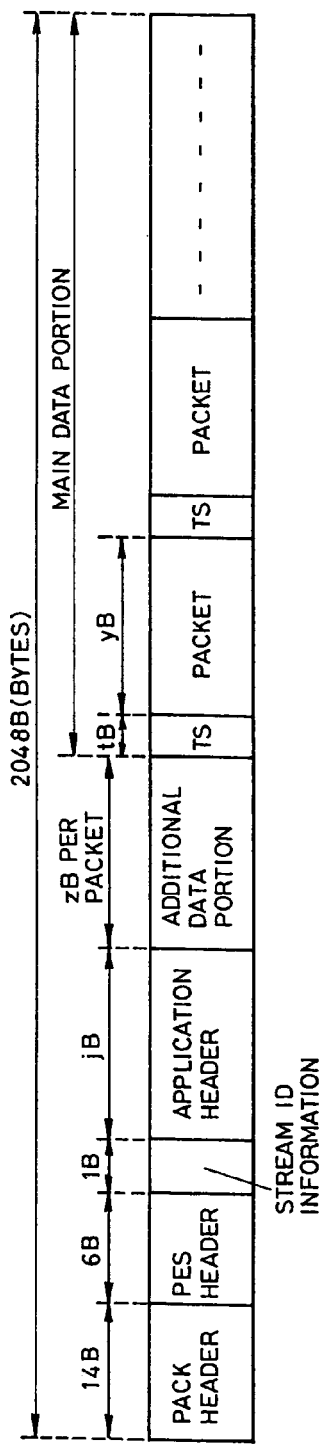
FIG. 2 is a diagram showing a sector structure.
Figure 3:
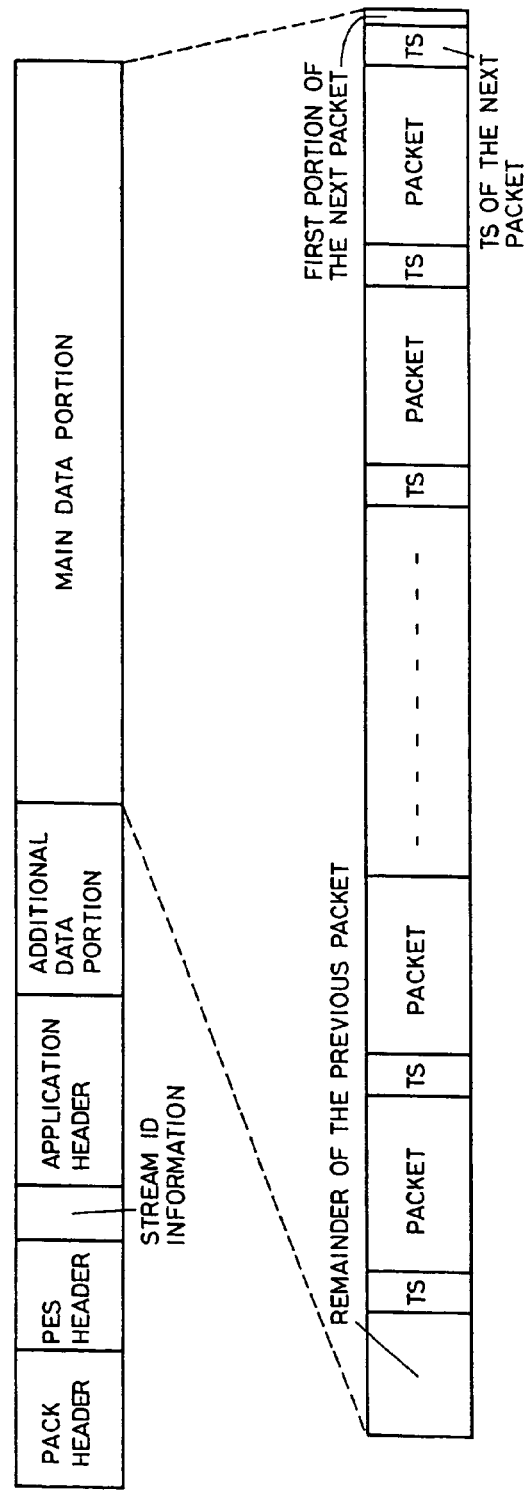
FIG. 3 is a diagram showing positions of partial packets.
Figure 4:
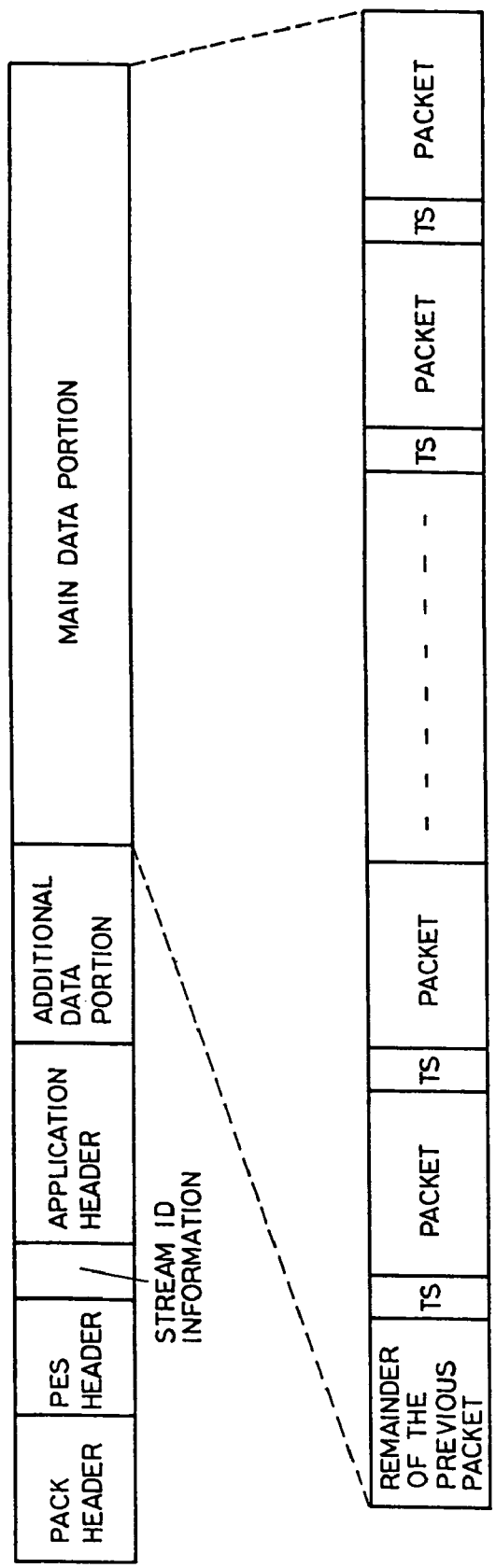
FIG. 4 is a diagram showing a sector in which a space area for the partial packet does not occur in an end portion of a main data portion.
Figure 5:
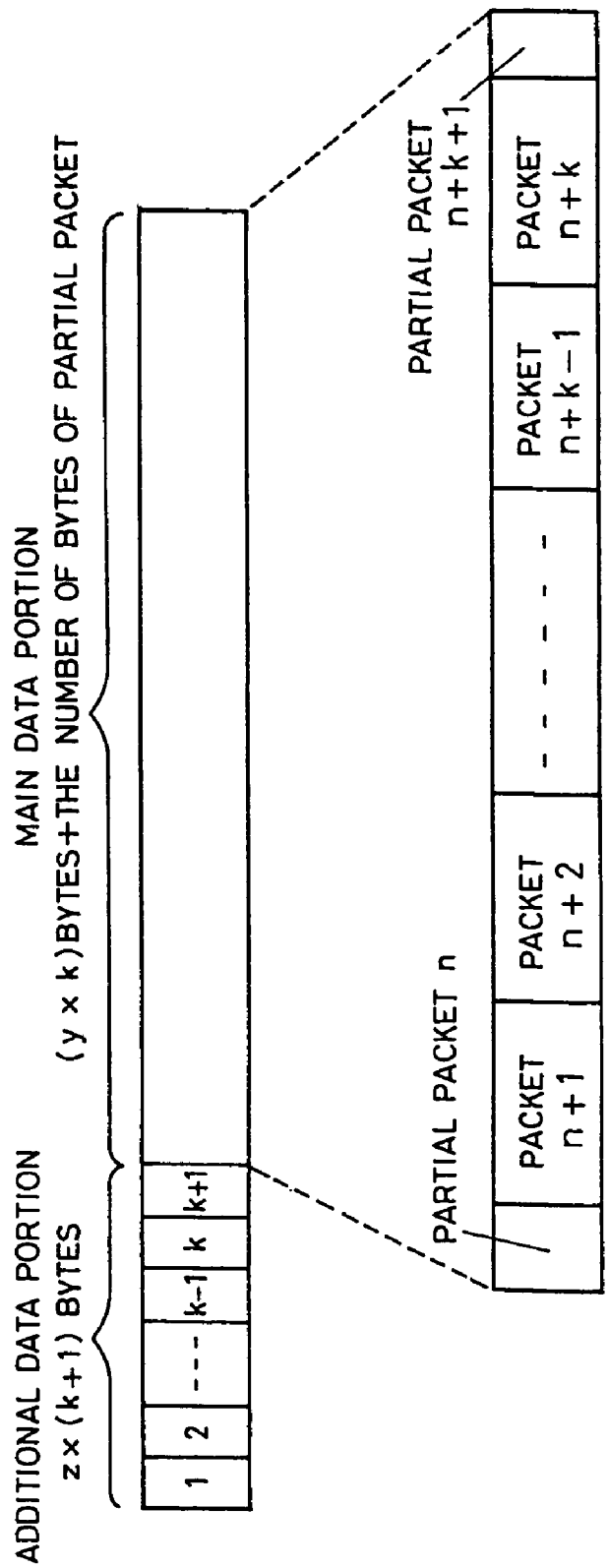
FIG. 5 is a diagram showing a structure of a data block.
Figure 6:
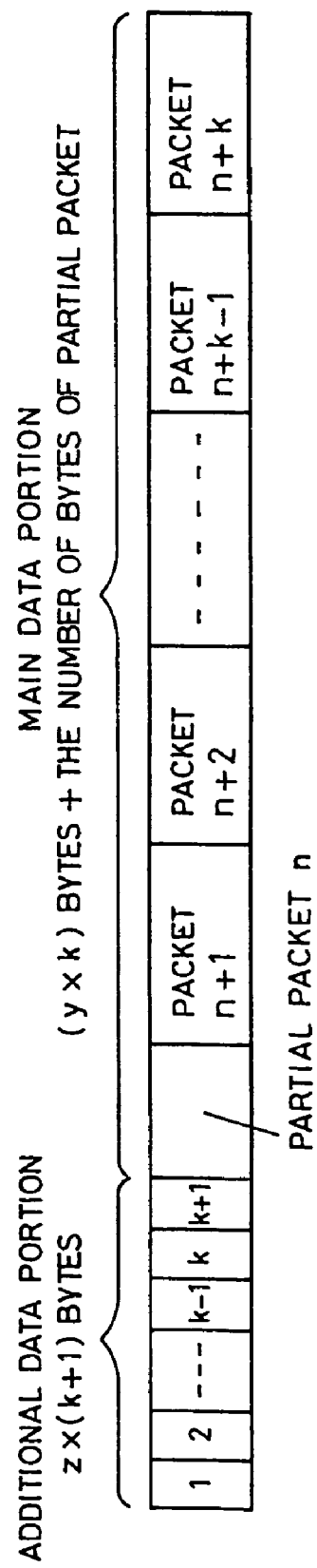
FIG. 6 is a diagram showing a block in which the space area for the partial packet does not occur in the end portion of the main data portion.
Figure 18:
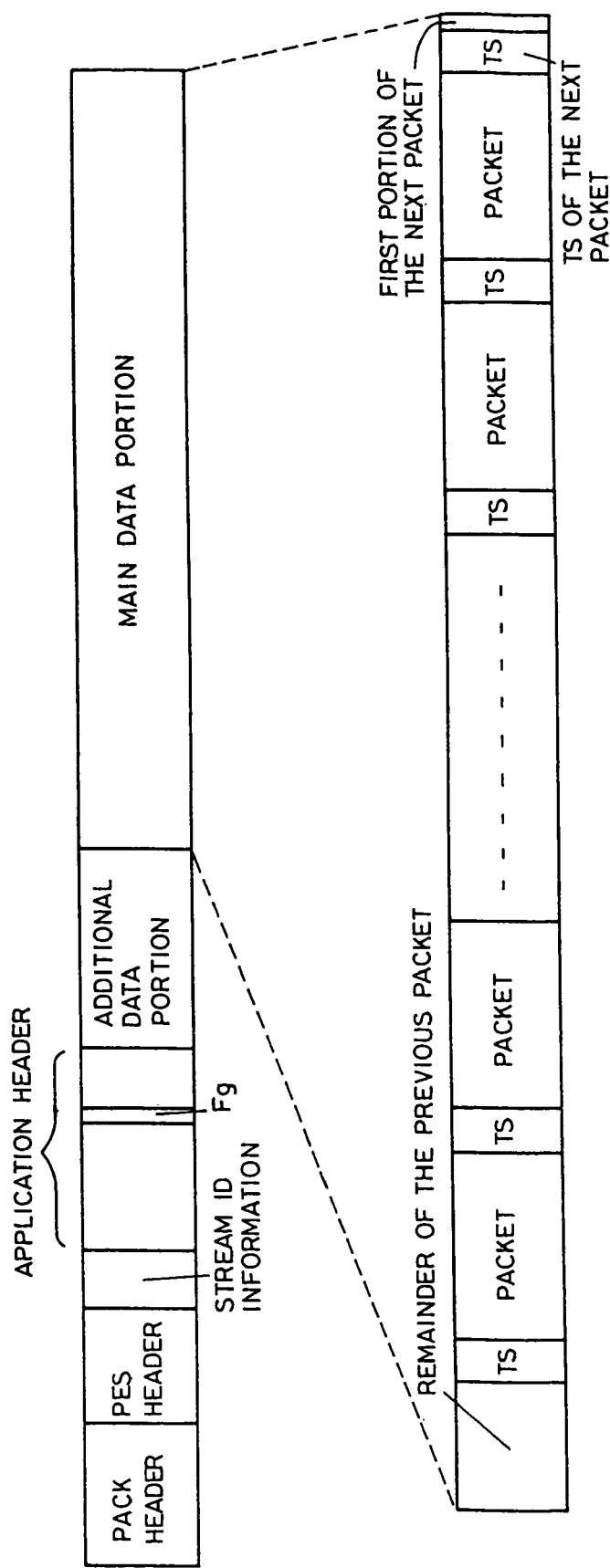
FIG. 18 is a diagram showing a sector structure in which the additional data invalid flag is provided in an application header.

The packet selecting circuit 21 extracts the Partial TS like P1, P3, P6, . . . as shown in FIG. 1B from the Full TS which is continuous with respect to time like packets P1, P2, P3, . . . as shown in FIG. 1A in accordance with a program designated by the user and supplies them to the time stamp circuit 22. The time stamp circuit 22 adds the arrival time of the packet of the Partial TS as a time stamp TS to the beginning of the packet. The sector data forming/sending circuit 23 forms a data block corresponding to the region of the sector in accordance with the packet having the time stamp TS supplied from the time stamp circuit 22 at the beginning. Although the sector has the structure shown in FIG. 2, the additional data invalid flag Fg is provided in the application header as shown in FIG. 18. The additional data invalid flag Fg is a flag showing whether the packet corresponding to the additional data locating at the end of the additional data portion exists in the main data portion or not. That is, if the time stamp TS of the next packet or the next packet itself is arranged in the main data portion as shown in FIG. 3, the additional data locating the end of the additional data portion is valid. Thus, the additional data invalid flag Fg is set to 0. If the time stamp TS of the next packet is not arranged in the main data portion as shown in FIG. 4, the additional data locating at the end of the additional data portion is invalid. Thus, the additional data invalid flag Fg is set to 1.

In a sector of a certain designated number, the number of space bytes is equal to z and if the z bytes are allocated to the additional data portion, the remaining bytes disappear as shown in FIG. 4 merely due to the allocation of them. One byte of either the time stamp of the next packet or the packet main body cannot be arranged in a sector of a certain designated number. The additional data invalid flag Fg of 1 is, therefore, set to the application header of the sector.

In the recording mode, the data blocks of the sector unit having the additional data invalid flag Fg which has been set as mentioned above are sequentially transmitted from the sector data forming/sending circuit 23 to the writing/reading circuit 24 and recorded onto a DVD 27 by the writing/reading circuit 12.

In the reproducing mode, the recording data is read out from the DVD 27 on a sector unit basis by the writing/reading circuit 24. The read-out data of the sectors is sequentially supplied from the writing/reading circuit 12 to the packet reproducing circuit 25.

In the reproducing circuit 25, as shown in FIG. 12, whether the additional data invalid flag Fg is equal to 1 or not is discriminated every sector. When Fg=0, the packets including all of the partial packets in the main data portion are reproduced on the basis of each additional data of the additional data portion. When Fg=1, the packets including all of the partial packets in the main data portion are reproduced on the basis of the additional data other than the additional data existing at the last byte position in the additional data portion.

In the reproducing process, the packets existing in the sector are converted into the digital bit stream, namely, Partial TS at the original timing on the basis of the time stamp TS. The digital bit stream from the reproducing circuit 25 is supplied to the decoder 26 and a reproduction signal of the selected program is generated by, for example, an MPEG decoding process.

One bit in each byte of the additional data portion can be also allocated to the additional data invalid flag Fg without providing the additional data invalid flag Fg for the application header. If the additional data corresponding to the partial packet is provided for the additional data portion and the space area does not occur in the end portion of the main data portion, the additional data corresponding to the partial packet is not provided for the additional data portion but padding data can be inserted into the end portion of the main data portion and the padding flag Fg indicative of the insertion of the padding data can be also provided for the application header.

As mentioned above, according to the present invention, such an inconvenience that in spite of the fact that the additional data regarding the partial packet to be located at the end of the main data portion exists in the additional data portion, the partial packet becomes the block in which no byte actually exists can be eliminated. After the data divided into blocks was sequentially recorded onto the recording medium, therefore, when the recorded data blocks are read out from the recording medium and reproduced, the original digital bit stream can be reproduced without causing an error.

What is claimed is:

1. A block forming method whereby a digital bit stream consisting of a plurality of packets having a same length is converted into a data block and at least a main data portion in which a plurality of complete packets and partial packets consisting of only partial data can be arranged and an additional data portion in which additional data of each of said complete packets in said main data portion and additional data of one partial packet are stored are formed at different positions of said data block, respectively, comprising the steps of:

when a space area smaller than one packet occurs in an end portion of said main data portion, storing a part of the data of a next packet into said space area, storing additional data of said next packet into said additional data portion as additional data of said one partial packet, and storing remaining data of the part of the data of said next packet into a start portion of the main data portion of a next data block; and when said space area does not occur in the end portion of said main data portion, storing additional data invalid information showing that the additional data of said one partial packet is invalid into a portion other than said main data portion in said data block.

2. A method according to claim 1, wherein said additional data invalid information is a flag which is arranged in a portion other than said main data portion and said additional data portion in said data block.

3. A method according to claim 1, wherein said additional data invalid information is a flag which is arranged in said additional data portion in said data block.

4. A block forming method whereby a digital bit stream consisting of a plurality of packets having a same length is converted into a data block and at least a main data portion in which a plurality of complete packets and partial packets consisting of only partial data can be arranged and an additional data portion in which additional data of each of said complete packets in said main data portion is stored are formed at different positions of said data block, respectively, comprising the steps of:

when a space area smaller than one packet and larger than a size of additional data occurs in an end portion of said main data portion, storing a part of the data of a next packet into said space area, storing the additional data of said next packet into said additional data portion as additional data of the part of the data of the next packet together with the additional data of each of said complete packets, and storing remaining data of the part of the data of said next packet into a start portion of the main data portion of a next data block; and when a space area smaller than the size of additional data occurs in the end portion of said main data portion, storing information showing that no partial packet exists in the end portion of said main data portion into a portion other than said main data portion and said additional data portion in said data block.

5. A method according to claim 4, wherein padding data in which each bit indicates zero is inserted into the space area smaller than the size of additional data of the end portion of said main data portion.

6. A block forming apparatus in which a digital bit stream consisting of a plurality of packets having a same length is converted into a data block and at least a main data portion in which a plurality of complete packets and partial packets consisting of only partial data can be arranged and an additional data portion in which additional data of each of said complete packets in said main data portion and additional data of one partial packet are stored are formed at different positions of said data block, respectively, comprising:

discriminating means for discriminating whether a space area smaller than one packet has occurred in an end portion of said main data portion or not, and block processing means for when the space area smaller than one packet occurs in the end portion of said main data portion, storing a part of the data of a next packet into said space area, storing additional data of said next packet into said additional data portion as additional data of said one partial packet, and storing remaining data of the part of the data of said next packet into a start portion of the main data portion of a next data block, wherein when said space area does not occur in the end portion of said main data portion, said block processing means stores additional data invalid information showing that the additional data of said one partial packet is invalid into a portion other than said main data portion in said data block.

7. An apparatus according to claim 6, wherein said additional data invalid information is a flag which is arranged in a portion other than said main data portion and said additional data portion in said data block.

8. An apparatus according to claim 6, wherein said additional data invalid information is a flag which is arranged in said additional data portion in said data block.

9. A block forming apparatus in which a digital bit stream consisting of a plurality of packets having a same length is converted into a data block and at least a main data portion in which a plurality of complete packets and partial packets consisting of only partial data can be arranged and an additional data portion in which additional data of each of said complete packets in said main data portion is stored are formed at different positions of said data block respectively, comprising:

means for discriminating whether a space area smaller than one packet and larger than a size of additional data has occurred in an end portion of said main data portion or not; and block processing means for when said space area smaller than one packet and larger than the size of additional data occurs in the end portion of said main data portion, storing a part of the data of a next packet into said space area, storing the additional data of said next packet into said additional data portion as additional data of the part of the data of the next packet together with the additional data of each of said complete packets, and storing remaining data of the part of the data of said next packet into a start portion of a next data block, wherein when a space area smaller than the size of additional data occurs in the end portion of said main data portion, said block processing means stores information showing that no partial packet exists in the end portion of said main data portion into a portion other than said main data portion and said additional data portion in said data block.

10. An apparatus according to claim 9, wherein padding data in which each bit indicates zero is inserted into the space area smaller than the size of additional data of the end portion of said main data portion.

11. A block forming method whereby a digital bit stream consisting of a plurality of packets is converted into a data block which includes at least a main data portion having a plurality of complete packets and partial packets consisting of only partial data, and an additional data portion arranged at a position different from said main data portion, having additional data of each of said complete packets in said main data portion and additional data of one partial packet, comprising the steps of:

when a space area smaller than one packet occurs in an end portion of said main data portion, storing a part of the data of a next packet into said space area, storing additional data of said next packet into said additional data portion as additional data of said one partial packet, and storing remaining data of the part of the data of said next packet into a start portion of the main data portion of a next data block; and storing additional data invalid information showing whether the additional data is invalid or not into a portion other than said main data portion in said data block.

12. A method according to claim 11, wherein said additional data invalid information is information determined in accordance with whether a partial packet is stored in the end portion of said main data portion or not.

13. A method according to claim 11, wherein said additional data invalid information is arranged at a position to be read earlier than said main data portion and said additional data portion in the data block.

14. A method according to claim 11, wherein said additional data is information for random access of a packet.

15. A block forming apparatus in which a digital bit stream consisting of a plurality of packets is converted into a data block which includes at least a main data portion having a plurality of complete packets and partial packets consisting of only partial data, and an additional data portion arranged at a position different from said main data portion, having additional data of each of said complete packets in said main data portion and additional data of one partial packet, comprising:

a discriminating device which discriminates whether a space area smaller than one packet has occurred in an end portion of said main data portion or not; and a block processing device which when the space area smaller than one packet occurs in the end portion of said main data portion, stores a part of the data of a next packet into said space area, stores additional data of said next packet into said additional data portion as additional data of said one partial packet, and stores remaining data of the part of the data of said next packet into a start portion of the main data portion of a next data block, wherein said block processing device stores an additional data invalid information showing whether the additional data is invalid or not into a portion other than said main data portion in said data block.

16. An apparatus according to claim 15, wherein said additional data invalid information is information determined in accordance with whether a partial packet is stored in the end portion of said main data portion or not.

17. An apparatus according to claim 15, wherein said additional data invalid information is arranged at a position to be read earlier than said main data portion and said additional data portion in the data block.

18. An apparatus according to claim 15, wherein said additional data is information for random access of a packet.

19. An information recording medium on which a digital bit stream consisting of a plurality of packets is recorded, the digital bit stream being converted into a data block which includes at least a main data portion having a plurality of complete packets and partial packets consisting of only partial data, and an additional data portion arranged at a position different from said main data portion, having additional data of each of said complete packets in said main data portion and additional data of one partial packet, wherein when a space area smaller than one packet occurs in an end portion of said main data portion, a part of the data of a next packet is stored into said space area, additional data of said next packet is stored into said additional data portion as additional data of said one partial packet, and remaining data of the part of the data of said next packet is stored into a start portion of the main data portion of a next data block; and wherein additional data invalid information showing whether the additional data is invalid or not is stored into a portion other than said main data portion in said data block.

20. An information recording medium according to claim 19, wherein said additional data invalid information is information determined in accordance with whether a partial packet is stored in the end portion of said main data portion or not.

21. An information recording medium according to claim 19, wherein said additional data invalid information is arranged at a position to be read earlier than said main data portion and said additional data portion in the data block.

22. An information recording medium according to claim 19, wherein said additional data is information for random access of a packet.

23. A playing apparatus for playing an information recording medium carrying a digital bit stream consisting of a plurality of packets is recorded, the digital bit stream being converted into a data block which includes at least a main data portion having a plurality of complete packets and partial packets consisting of only partial data, and an additional data portion arranged at a position different from said main data portion, having additional data of each of said complete packets in said main data portion and additional data of one partial packet, wherein when a space area smaller than one packet occurs in an end portion of said main data portion, a part of the data of a next packet is stored into said space area, additional data of said next packet is stored into said additional data portion as additional data of said one partial packet, and remaining data of the part of the data of said next packet is stored into a start portion of the main data portion of a next data block; and wherein additional data invalid information showing whether the additional data is invalid or not is stored into a portion other than said main data portion in said data block, said apparatus comprising:

a reading device which reads the additional data invalid information in said data block; and a reproducing device which reproduces the packet in said data block in accordance with the read additional data invalid information.

24. A playing apparatus according to claim 23, wherein said additional data invalid information is information determined in accordance with whether a partial packet is stored in the end portion of said main data portion or not.

25. A playing apparatus according to claim 23, wherein said additional data invalid information is arranged at a position to be read earlier than said main data portion and said additional data portion in the data block.

26. A playing apparatus according to claim 23, wherein said additional data is information for random access of a packet.

27. A playing method for playing an information recording medium carrying a digital bit stream consisting of a plurality of packets is recorded, the digital bit stream being converted into a data block which includes at least a main data portion having a plurality of complete packets and partial packets consisting of only partial data, and an additional data portion arranged at a position different from said main data portion, having additional data of each of said complete packets in said main data portion and additional data of one partial packet, wherein when a space area smaller than one packet occurs in an end portion of said main data portion, a part of the data of a next packet is stored into said space area, additional data of said next packet is stored into said additional data portion as additional data of said one partial packet, and remaining data of the part of the data of said next packet is stored into a start portion of the main data portion of a next data block; and wherein additional data invalid information showing whether the additional data is invalid or not is stored into a portion other than said main data portion in said data block, said method comprising the steps of:

reading the additional data invalid information in said data block, and reproducing the packet in said data block in accordance with the read additional data invalid information.

28. A method according to claim 27, wherein said additional data invalid information is information determined in accordance with whether a partial packet is stored in the end portion of said main data portion or not.

29. A method according to claim 27, wherein said additional data invalid information is arranged at a position to be read earlier than said main data portion and said additional data portion in the data block.

30. A method according to claim 27, wherein said additional data is information for random access of a packet.

* * * * *